United States Patent [19]

Lane et al.

[11] Patent Number: 5,452,172
[45] Date of Patent: Sep. 19, 1995

[54] AUTO-RECLOSERS

[76] Inventors: Stephen E. Lane, 8 Masefield Crescent, Droylsden, Manchester, M35 6RW, England; Martin Snell, 50 Newington Drive, Bury, Lancashire, BL8 2DZ, England

[21] Appl. No.: 78,986

[22] Filed: Jun. 16, 1993

[30] Foreign Application Priority Data

Jul. 20, 1992 [GB] United Kingdom ................ 9215405

[51] Int. Cl.⁶ ............................................. H02H 7/22
[52] U.S. Cl. ............................................. 361/71; 361/72
[58] Field of Search ................... 361/71, 72; 335/179, 335/180

[56] References Cited

U.S. PATENT DOCUMENTS

| | | | |
|---|---|---|---|
| 3,662,220 | 5/1972 | Riebs | 361/71 |
| 4,184,186 | 1/1980 | Barkan | 361/10 |
| 4,876,521 | 10/1989 | Boyd | 335/179 |
| 4,931,896 | 6/1990 | LeCourt | 361/73 |
| 5,117,325 | 5/1992 | Dunk et al. | 361/71 |

FOREIGN PATENT DOCUMENTS

| | | |
|---|---|---|
| 0279692 | 8/1988 | European Pat. Off. . |
| 0354803A1 | 2/1990 | European Pat. Off. . |
| 1216339 | 12/1970 | United Kingdom . |

*Primary Examiner*—A. D. Pellinen
*Assistant Examiner*—Sally C. Medley
*Attorney, Agent, or Firm*—Kirschstein et al.

[57] ABSTRACT

An auto-recloser circuit-breaker has three vacuum interrupters driven from a single bistable magnetic actuator which is powered by a first lithium sulphur dioxide battery under control of an electronic protection relay which is powered by a second lithium sulphur dioxide battery. The drive mechanism, actuator and relay are designed to minimize current consumed by the batteries so that the recloser may be self-powered for its full life by these batteries independent of the power line in which it is connected.

9 Claims, 6 Drawing Sheets

WAKE UP CIRCUIT

AUTO-RECLOSERS

BACKGROUND OF THE INVENTION

1. Field of the Invention

This invention relates to auto-reclosers.

2. Description of Related Art

A pole mounted auto-recloser is a high voltage pole-top mounted reclosing circuit-breaker which is used to protect high voltage overhead electrical power distribution lines. The function of the recloser is to reduce system interruption to a minimum if a transient or permanent fault should occur on the system. The recloser senses fault current in the main HV circuit, that is in the three phase power line, and opens its three main contacts to interrupt the current. After a short period known as the dead-time the recloser will reclose. Most faults are transient in nature and will clear during the dead-time so that when the unit recloses the HV supply is restored. If the fault has not cleared the recloser senses the fault current and again opens to interrupt it. The recloser can attempt to reclose up to say three times. If the fault is permanent after a predetermined number of trips it will remain open thereby isolating the faulty section of line.

An inherent problem with pole mounted reclosers is that such equipment is typically situated in remote locations. For this reason they have to be very reliable with very long intervals between maintenance periods. Also there will be no local power supply for opening and closing the recloser main contacts or for supplying the electronic protection and control unit part of the recloser.

There are many solutions to the problem of power supply all of which have involved obtaining power either directly or indirectly from the HV supply. This presents problems when one considers the fact that there will be a fault on the HV supply at the very moment when the HV supply is required to operate the recloser; also it is not possible to close the recloser if there is no HV supply.

SUMMARY OF THE INVENTION

According to the invention, there is provided an auto-recloser circuit-breaker for use with a three phase high voltage electrical power distribution line, the auto-recloser including (a) three vacuum interrupters for connection one in each phase of the power line, (b) current transformer means for sensing current on the power line, (c) an electronic protection relay having inputs connected to said current transformer means and outputs for providing auto-reclose control pulses, (d) a first, comparatively low voltage, power supply connected for operating the protection relay, (e) operating means for opening and closing the interrupters responsive to the control pulses from the relay, the operating means including a single bistable magnetic actuator and a drive mechanism connected between the three interrupters and the magnetic actuator, the magnetic actuator having a reciprocable armature, two electro-magnetic coils each for moving the armature to one of two positions, and a permanent magnet for holding the armature in either position, and (f) a second, comparatively high voltage, power supply for energizing the magnetic actuator, this second power supply being connected to each magnetic actuator coil via a respective electronic switch responsive to the auto-reclose control pulses from the relay; wherein the first and second power supplies are provided by lithium sulphur dioxide battery means, the auto-recloser being powered solely by this battery means and not by the high voltage power line.

The first and second power supplies may be provided each from a separate lithium sulphur dioxide battery.

The drive mechanism may include three drive rods, one said rod for operating each interrupter, and with the three drive rods arranged to be driven together directly by said reciprocable armature of said magnetic actuator in line with the movement of said armature. In this case, the three drive rods may be linked to the actuator by a single cross-beam, each rod being maintained in line by a spring in a pocket in the beam without contact between the rod and the beam.

The magnetic circuit in the actuator due to the permanent magnet may be arranged to provide a static force to hold the armature in its stable position corresponding to the interrupters being closed greater than the static force to hold the armature in the stable position corresponding to the interrupters being open.

The armature and/or a pole piece in the actuator may be shaped to modify the flux in an air gap between them so that in response to a control pulse to operate the actuator to the open position of the interrupters the armature is preferentially biased by the permanent magnet rewards that open position.

A parallel path circuit may be provided for each actuator coil to circulate current due to emfs generated in the coils resulting from actuation, and with impedance provided in each said parallel path circuit to reduce opposition to movement of the armature due to such current.

The protection relay may include wake-up and power-down circuit means to reduce consumption of battery energy. In this case, the wake-up circuit means may include a comparator and a latch in CMOS to minimize the battery energy which is continuously consumed by these components.

The self powered recloser according to the invention has solved the following design problems:

1. A self contained stored energy supply capable of supplying the recloser for a minimum period of 10 years and 10,000 operations is required.

2. A very efficient method of opening and closing the main interrupter contacts is required in order to maximize the number of operations available from a given energy source.

3. The electronic protection must also be capable of operating over a ten year period from a self contained energy source.

Important features of the exemplary embodiment to be described below are as follows:

1. The electronic protection and control unit, the protection relay, is designed to draw a very small current from a 12 V Lithium Sulphur Dioxide battery in the order of 15 $\mu$A under normal conditions by extensive use of CMOS technology in particular in a wake-up circuit.

2. The design of the drive system, the interrupters used and the construction of magnetic actuator have been optimized in order to use the minimum energy possible from a primary battery supply.

3. A Lithium Sulphur Dioxide battery system is used. Important features of the LS02 battery system for use with the recloser are:

3.1 Long shelf life; self discharge rate lower than any other battery system suitable for at least 10 years maintenance free life.

3.2 Very high energy density; stored energy sufficient for 10,000 operations.

3.3 Wide operating temperature range; −55° C. to +70° C.

3.4 High discharge current capability

BRIEF DESCRIPTION OF THE DRAWINGS

An exemplary embodiment of the invention will now be described with reference to the following drawings.

DETAILED DESCRIPTION OF THE PREFERRED EMBODIMENT

Figure 1:
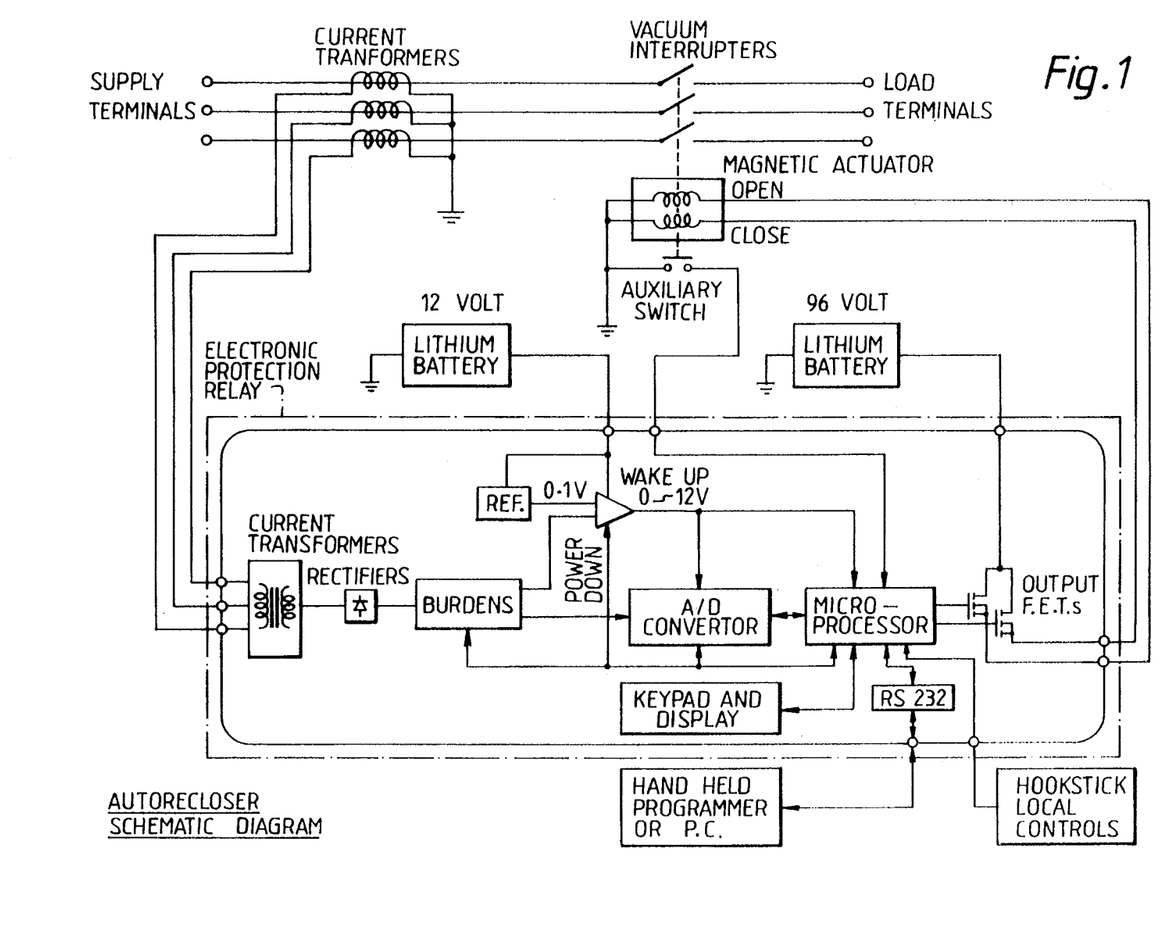
FIG. 1 is a schematic diagram of an auto-recloser circuit breaker.

Referring now to FIG. 1, there is shown a schematic diagram of an auto-recloser circuit breaker for use with a three phase high voltage electrical power distribution line. The three phase power line is shown extending through the auto-recloser from three supply side terminals to three corresponding load side terminals. The high voltage could typically be 15 kV and the normal load current typically less than 1 kA. Three vacuum interrupters are provided for connection one in each phase of the power line as shown. Three ring current transformers are provided for sensing current on the power line. An electronic protection relay has inputs connected to these current transformers and outputs for providing auto-reclose control pulses. A 12 volt Lithium Sulphur Dioxide battery provides a power supply connected for operating the protection relay. Operating means for opening and closing the vacuum interrupters responsive to the control pulses from the relay include a single bistable magnetic actuator and a drive mechanism (shown by the single dotted line) connected between the three interrupters and the magnetic actuator. The magnetic actuator (to be later described in detail with reference to FIGS. 4 and 5) has a reciprocable armature, two electromagnetic coils (shown as "open" and "close" in FIG. 1) each for moving the armature to one of two positions, and a permanent magnet for holding the armature in either position.

A 96 volt lithium sulphur dioxide battery is provided for energizing the magnetic actuator, this battery being connected to each magnetic actuator coil via a respective electronic switch (output FET as shown) responsive to the auto-reclose control pulses from the relay. Thus the recloser is powered solely by the two batteries and not by the high voltage power line.

A microprocessor in the relay provides the control pulses to the output FETs to control the opening (tripping) and closing operations of the recloser. An auxiliary switch (shown in FIG. 1) is connected to the recloser main drive shaft and signals the position of the recloser to the microprocessor which will terminate the trip or close signal accordingly. By means of parallel path circuit means connected to each actuator coil (as will be described later in detail with reference to FIG. 3), the close and trip current pulses are controlled to the minimum length necessary to ensure correct operation thereby minimizing the amount of energy taken from the 96 volt battery. The current required to be supplied by this battery will be between approximately 25 A and 30 A, which comes as a requirement from the design of the magnetic actuator and the load on the actuator from the interrupter drive mechanism. The required voltage for this battery, according to temperature conditions of use, could be between say 90–105 V.

Figures 2, 3:
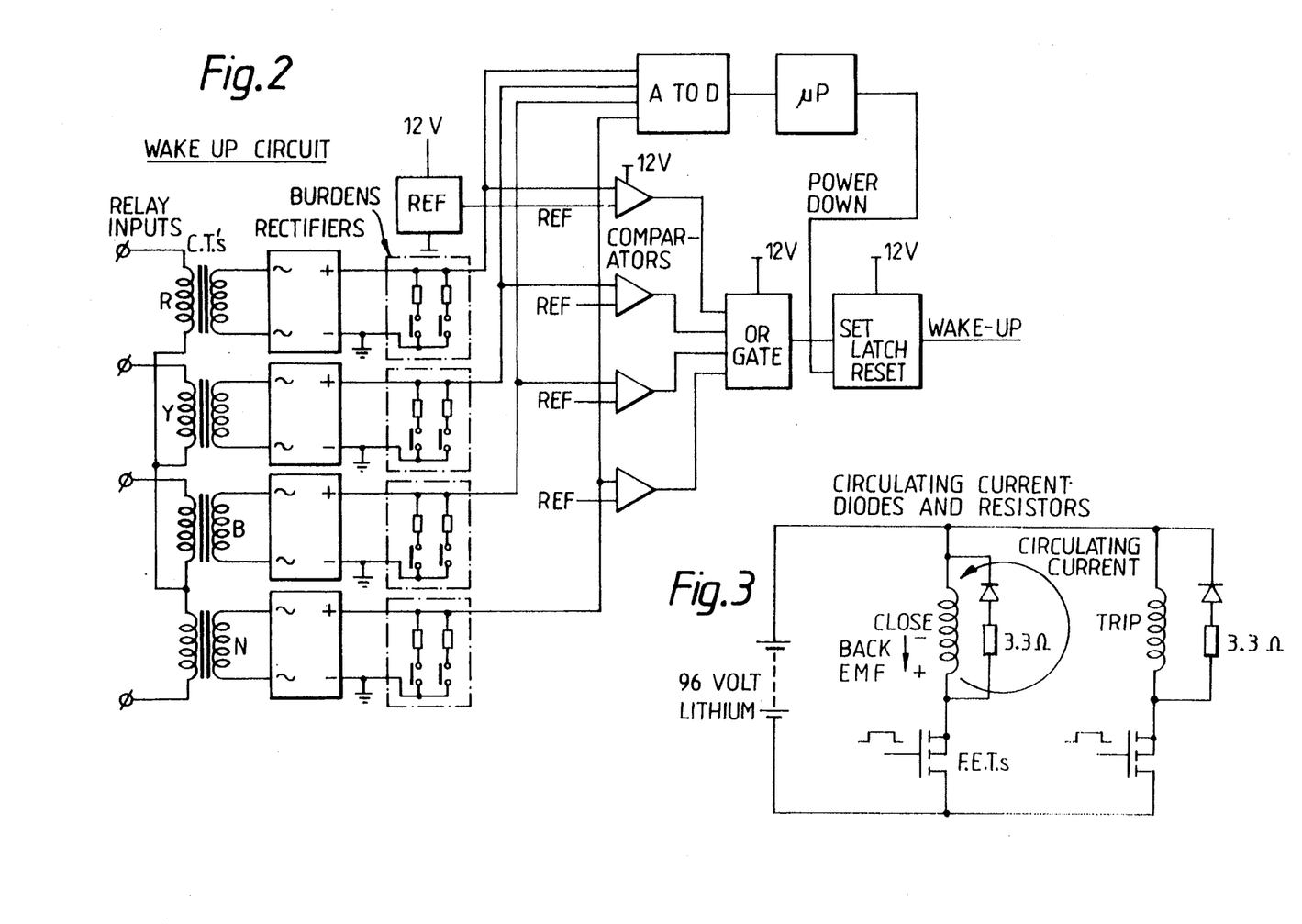
FIG. 2 is a schematic diagram of an electronic protection relay.
FIG. 3 is a schematic diagram of a circulating current circuit.

The configuration and operation of the electronic protection relay will now be described in detail with reference to FIGS. 1 and 2. The current transformers on the three phase power line will bring the normal load current down to below say approximately 100 A at the inputs to the relay. The current transformers within the relay will further bring these currents down to below say approximately 100 mA. FIG. 2 shows four current transformers in the relay. The outputs of these four current transformers are each passed through a rectifier circuit to a burdens circuit. The burdens circuits, as shown in FIG. 2, can have switched in a selected parallel resistors to translate the rectified current at whatever protection level is required to a predetermined voltage output, for example a protection level of 100 mA is translated to an output from the burdens circuits of 0.1 volts. In a manner, not shown, this switching in of resistors in the burdens circuits is controlled from the microprocessor. The 12 volt lithium sulphur dioxide battery continuously supplies a wake-up circuit including a reference voltage circuit, four comparators, an OR gate and a latch. These circuit components are in CMOS and continuously take only a very small current (15 $\mu$A) from the 12 volt battery. This battery can sustain this load for greater than its expected life of 10 years. The reference voltage circuit consumes only say 1–1.5 $\mu$A from the 12 V battery and supplies a reference voltage of say 0.1 volt to one input of each of the four comparators. The outputs from the burdens circuits are connected respectively to the other inputs of the comparators. If any of the four comparators detects a particular fault condition on the power line as determined by the output from the corresponding burdens circuit then, via the OR gate, the latch is set and provides a wake-up signal to power up the microprocessor and the A/D converter which is provided between the burdens circuit outputs and the microprocessor. There is actually a voltage regulator (not shown) between the 12 V battery and the microprocessor which is thereby powered from 5 volts. Although the A/D converter is shown here separately it is in fact, together with a multiplexer for scanning all the burdens outputs, integrated with the microprocessor in a microcontroller. The value of the power line overload as outputs from the burdens circuits is measured by the A/D converter and determines the tripping time set by the microprocessor. Thus a massive overload requires the lowest possible tripping time, i.e. the vacuum interrupters should be tripped open straight away. For a small overload a certain length of tripping time is set; for example a 50% overload could provide a 1½ second tripping time or a 10 times overload could provide a 350 msec tripping time. The microprocessor provides a sequence of actuator opening and closing pulses to the output FETs. If the fault is temporary the primary currents drop below the minimum tripping current level to the normal load current level or if the fault is continuous the re-closer locks-out in the open position at the end of its sequence, this being a sequence of say three or four open and close operations. Whatever the conclusion the microprocessor resets the latch and the electronic protection resumes to its quiescent state drawing a few microamps (say 15 μA). A further feature of the particular microprocessor and immediate peripherals is that they were chosen for low power consumption and also because it is possible to put them in a very low power 'standby' mode during periods when the microprocessor is timing out an operation such as a dead time or tripping time. Thus dead time is when the circuit breaker has been tripped and all that the microprocessor is doing is timing a certain programme time, say between ¼ sec and 180 secs before a re-closing pulse is required. Just running the timer can be in this very low power 'standby' mode.

FIG. 3 shows the two actuator coils connected to the 96 volt Lithium sulphur dioxide battery via the FETs as has been shown in FIG. 2 and a diode and resistor in series with each other and in parallel with each coil.

The diodes are included to protect the FETs at turn-off. The two solenoid coils which are highly inductive produce a large back-emf when the FETs turn off (L di/dt). Without the diodes this voltage would appear across the FETs. With the diodes in the circuit the voltage is limited to the battery voltage as the back emf causes current to flow around the local loop until the energy stored has exponentially decayed away.

However, this can cause problems with the magnetic actuator. When the close coil is energized, transformer action causes a current to be induced in the trip-solenoid coil around the diode circuit even though the FET is turned off. This current causes the trip coil to oppose the intended closing operation and more current is drawn from the 96 volt Lithium battery. We have combatted this by putting a resistor in series with the diode which reduces this effect to a negligable level whilst keeping the back emf to below the rating of the FETs. The use of resistors in this manner has given about 25% increase in efficiency with a consequent beneficial effect on battery operation.

Figure 4:
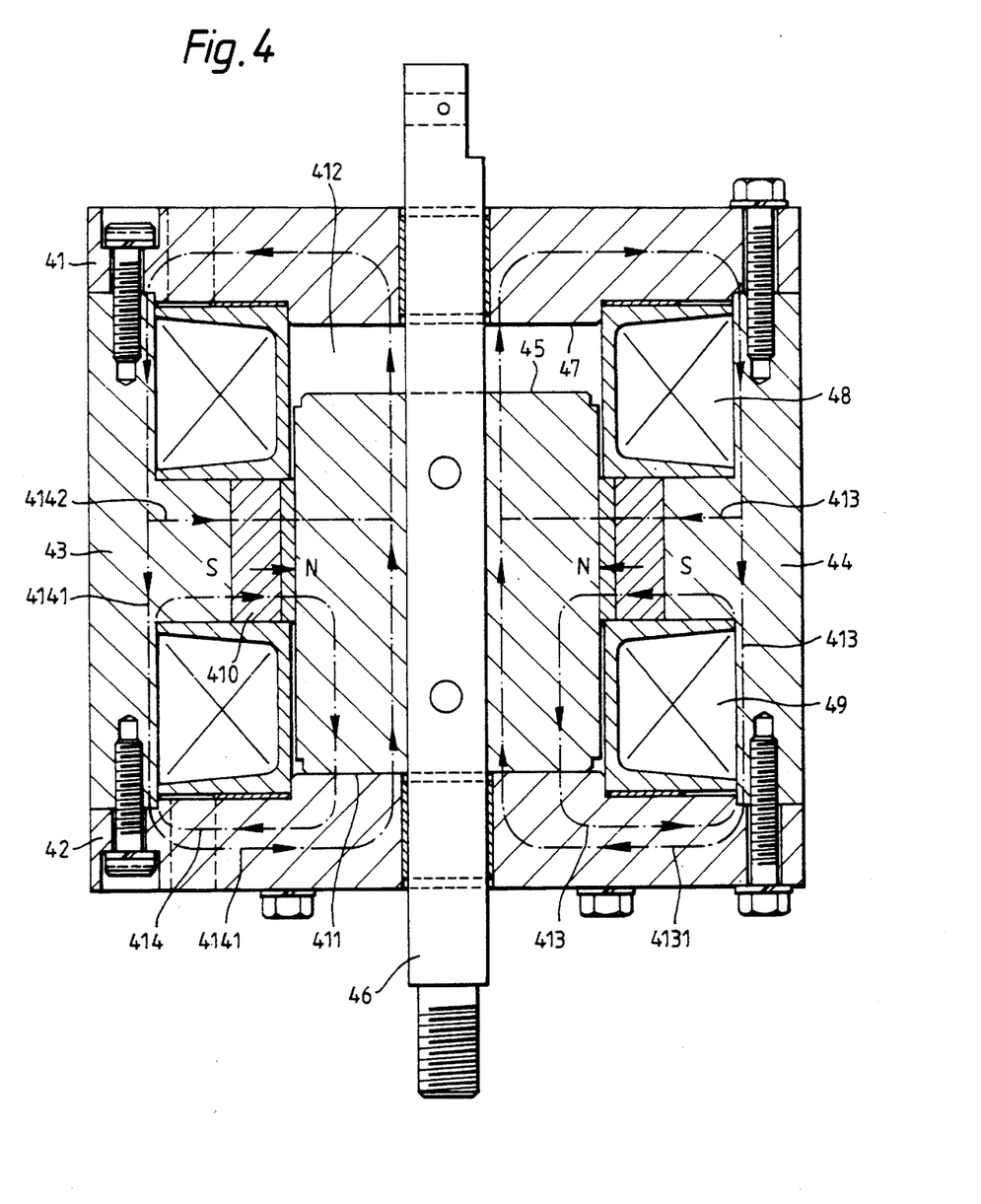
FIG. 4 is a cross-section of a magnetic actuator.
Figure 5A:
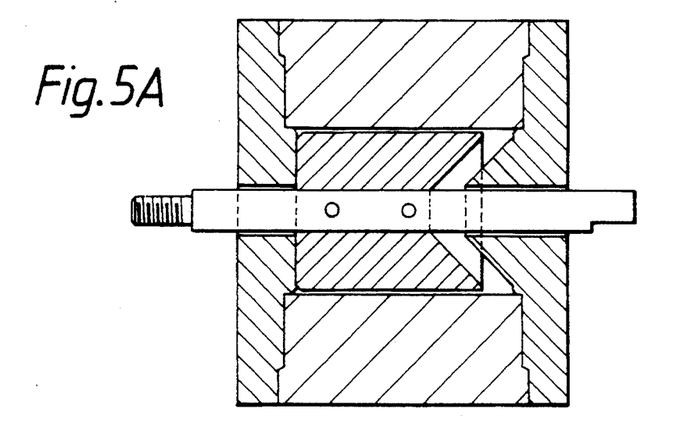
FIG. 5A is one embodiment of a magnetic circuit.
Figure 5B:
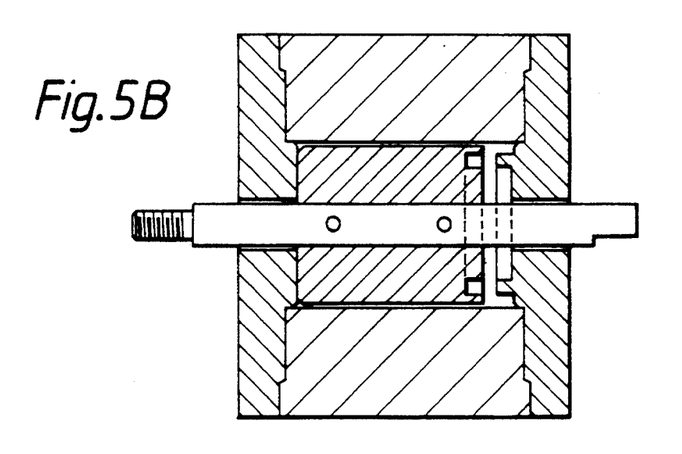
FIG. 5B is another embodiment of a magnetic circuit.
Figure 5C:
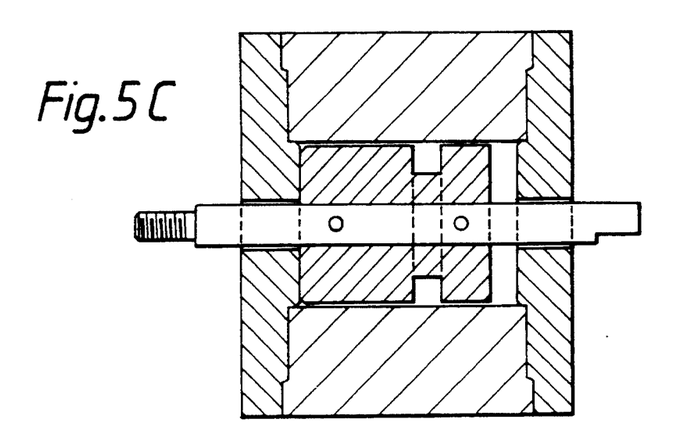
FIG. 5C is still another embodiment of a magnetic circuit.

The magnetic actuator build up and a description of its operation follows with reference to FIGS. 4 and 5.

An actuator rod 46 is reciprocable with an armature 45 through openings in a pair of parallel end plates constituting pole pieces 41, 42, whose inner faces act as end stops for the armature 45. The pole pieces 41, 42 are connected by side plates 43, 44 which, with the pole pieces, support two fixed, annular, coaxial electromagnetic coils 48, 49 adjacent respective ends of the armature 45, and a fixed, centrally-disposed, coaxial, cylindrical permanent magnet 410.

The permanent magnet 410, extends axially over a central region of the armature 45 at all positions of the armature, and it is radially polarized as shown (S-N; N-S). In this example, the magnet is of neodymium-boron-iron, although another rare-earth magnetic material such as samarium-cobalt could be used especially where high temperatures are likely to be encountered.

The magnet has the approximate dimensions of 70 mm long by 60 mm internal diameter, and produces a flux density of around 0.7 Webers per square meter at the centre and 1.7 Webers per square meter at its ends. Similar field strengths could alternatively be obtained from an AlNiCo magnet, but the properties of such a material are less advantageous in this particular application.

In use, with the armature at one stable position, as shown in FIG. 4, it is held there by the permanent magnet which generates a low reluctance magnetic circuit 413, 414. On energizing the electromagnet coil 48 nearer the other end of the armature to produce a magnetic field 4131, 4141 in the sense shown, the flux of the original, low reluctance magnetic circuit 413, 414 is diverted, or, in a sense, opposed and cancelled, so that the flux density at the interface 411 of the armature and its end strip is substantially reduced, destabilizing the armature.

At the same time, the flux is increased across the air gap 412 (approximately 14 mm in this example) between the armature and the other of its end stops 41, tending to attract the armature towards its opposite stable position. Also, the relatively small amount of magnetic flux 4132, 4142 generated by the electromagnet coil and passing through the permanent magnet is such as to maintain its magnetism, not to demagnetize the permanent magnet. Mare flux 4131, 4141 from the electromagnet coil 48 passes through the lower end plate 42 than through the relatively high-reluctance permanent magnet via path 4132, 4142.

Movement of the armature from its other stable position is achieved by energizing the other electromagnet coil 49 in the same sense, thus similarly avoiding demagnetization of the permanent magnet 410.

Although the configuration of the permanent magnet is cylindrical or annular in this example, other tubular configurations are feasible, including ones which are rotationally asymmetric about the longitudinal axis. The magnet should be tubular in the sense that it provides a longitudinal passage for the armature. The magnet could be formed as a unitary structure or segmented.

For ergonomic utilization of the battery, the actuator efficiency and the way in which it is employed on the Auto recloser needs to be optimized.

One or more of the following techniques may be used to tailor the basic actuator to the required application.

In most cases it is desirable that the magnetic circuit due to the permanent magnet results in static forces which differ in the two stable positions. The static force to hold the interrupters in the closed position may be 3 times greater than the static force to hold the interrupters in the open position.

This may be achieved by arranging the respective magnetic circuits such that the chosen value of reluctance will give the required flux level and hold-on force.

A simple means of achieving this will be by adding a non-ferrous washer 47 of required thickness over the rod 46. Many alternative methods will be possible but the effect of these on the dynamic operation of the actuator must be considered.

It may be required that the armature 45, whilst in transit from one stable position to the other be preferentially biased in one direction due to the permanent magnet alone. This could be necessary to avoid a meta-stable position occurring at an undesirable point in the travel or to efficiently drive the armature over an increased distance with the required force/displacement.

Several methods of achieving this are proposed, which involve shaping the pole pieces 41, 42 and armature 45 such that the flux will be modified in the required air gap.

1. Interlocking conical pole piece and armature acting such that the cross sectional area in the direction of the flux is increased. (FIG. 5A)
2. Interlocking slotted pole piece and armature acting such that the apparent air gap in the direction of the flux is reduced. (FIG. 5B)
3. Cutting a groove around the circumference of the armature body in the vicinity of the magnet 410, such as to vary the reluctance of the circuit dependent upon armature position. (FIG. 5C)

Efficient operation with a battery is dependent upon the minimum voltage practicable being used to energize the coils. It is thus desirable to minimalize any emf generated in the coils during operation which will produce current which will tend to oppose movement of the armature.

These emfs may be produced by either transformer action as has been described above with reference to FIG. 3 from the current in the opposing coil or be generated in both coils by the movement of the armature. The resultant current will circulate in any low impedance path in parallel with the coils, (e.g. free-wheeling diode as shown in FIG. 3).

The design incorporates a method of increasing the impedance of this path, thus significantly reducing the value of the current and associated field. An example is use of the resistors shown in FIG. 3.

A further advantage of this increased impedance is that the reduction of circulating current will reduce opposition to movement of the armature when the coils are not energized.

Figure 6:
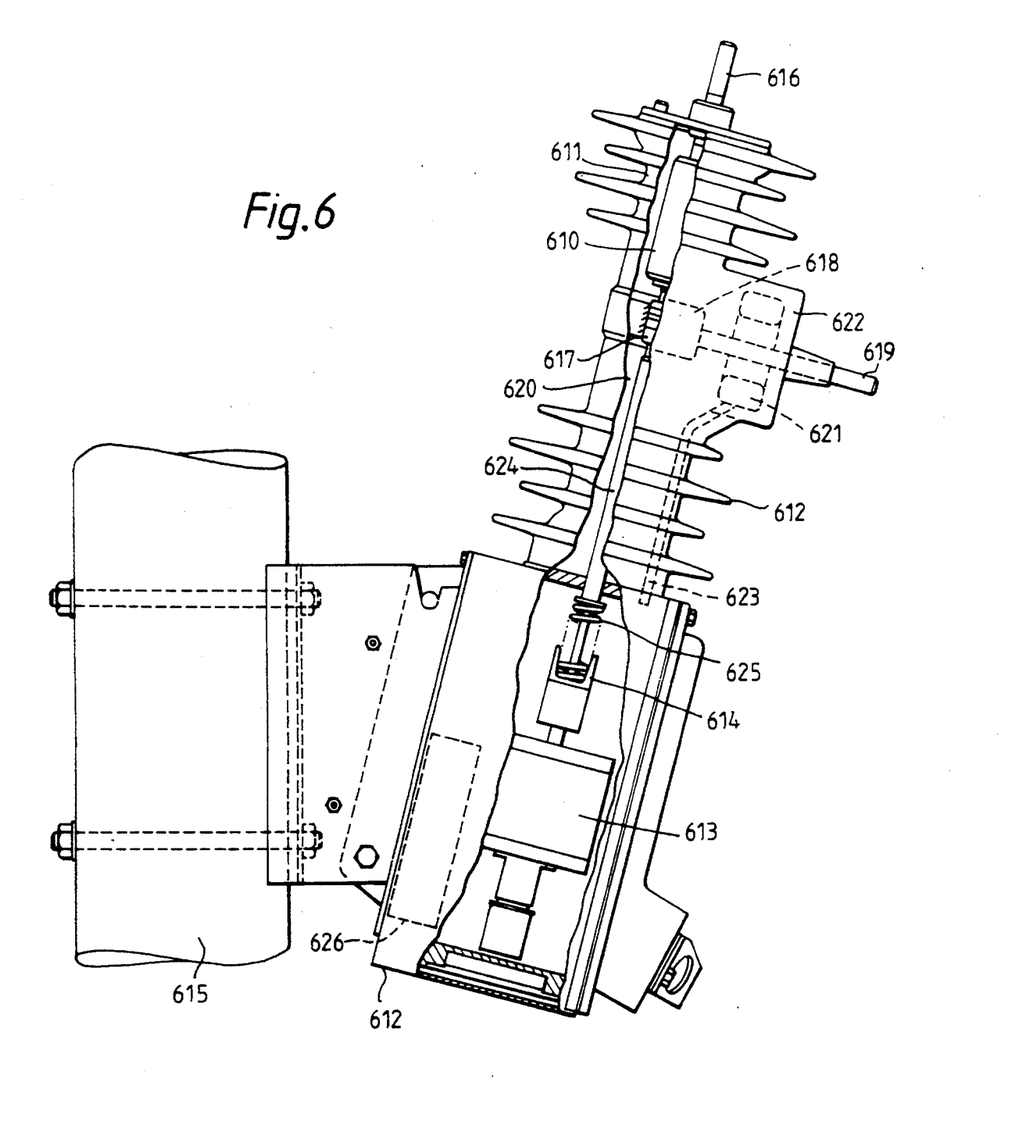
FIG. 6 is a side view of an auto-recloser circuit breaker.

Referring now to FIG. 6, an auto-recloser circuit breaker, principally for outdoor use but optionally for indoor applications, comprises, for each of three phases, a vacuum interrupter 610 housed in an EPDM rubber body 611. A single kiosk 612 houses the bistable magnetic actuator 613 of the type described above with reference to FIGS. 4 and 5, which operates all three vacuum interrupters 610 by way of a cross beam 614.

The kiosk may rest on the ground, or else it may be mounted on a plinth or on a pole 615 as shown.

The interrupter contacts are maintained in either the closed or the open position by the magnetic actuator. The fixed contact is connected to an upper line terminal 616 integral with a support casing, and the movable contact to an axially reciprocable transfer contact 617 which slides within a ring-shaped fixed contact 618 connected to a side-mounted terminal 619. The side terminal 619 consists of a rod projecting transversely from an insulating bushing forming part of the rubber body 611. The body 611 has a number of rain sheds 612 moulded onto its outer surface to increase external creepage and flashover distances across the interrupter and from the interrupter 610 to the supporting kiosk 612 which is at earth potential. The inner surface of the EPDM rubber body 611 is lined by a reinforced plastics tube which provides mechanical strength and separates the EPDM rubber from a dielectric liquid or gaseous insulating medium 620 in which the internal parts are immersed. In this example, the medium 620 is $SF_6$ gas, supplied through a filling valve.

A protective current transformer core and toroidally wound secondary winding 621 surround the side-mounted line terminal 619, and are encapsulated in the bushing 622 integral with the rubber body 611. The output from the current transformer is connected by a line 623, encapsulated in the rubber body 611, to the actuator assembly 613.

The single actuator 613 is in line with the three vacuum interrupters, which it drives by way of a purely mechanical, direct linkage. The linkage comprises an axial, insulating drive rod 624 for each interrupter connected at its upper end to the sliding contact 617 and at its lower end, via surrounding spring 625 in the cross beam 614, via a lost motion device to the actuator shaft. The rods extend axially through the base of the rubber body 611 and through the roof of the kiosk 612, which is sealed against the underside of the base of the rubber body 611.

Where the drive rods 624 and interrupters 610 are insulated by a gas, the space within the kiosk may communicate with that within the rubber body 611, avoiding the need for the potentially leaky mechanical gas seals.

The electronic protection relay which is located with the two lithium sulphur dioxide batteries in a housing 626 responds to a signal from the current transformer 621 indicative of either an over-current condition, a short circuit or an earth fault, to send an appropriate short pulse to activate the actuator. As has been described above with reference to FIGS. 1 and 2, the relay includes a sequence timer for the auto-reclose function, which causes the interrupter contacts to reclose after a predetermined interval following circuit interruption. If the fault is not cured and the circuit is interrupted a second time, the circuit recloses after a predetermined interval; and so on for the auto-reclose sequence.

Figure 7:
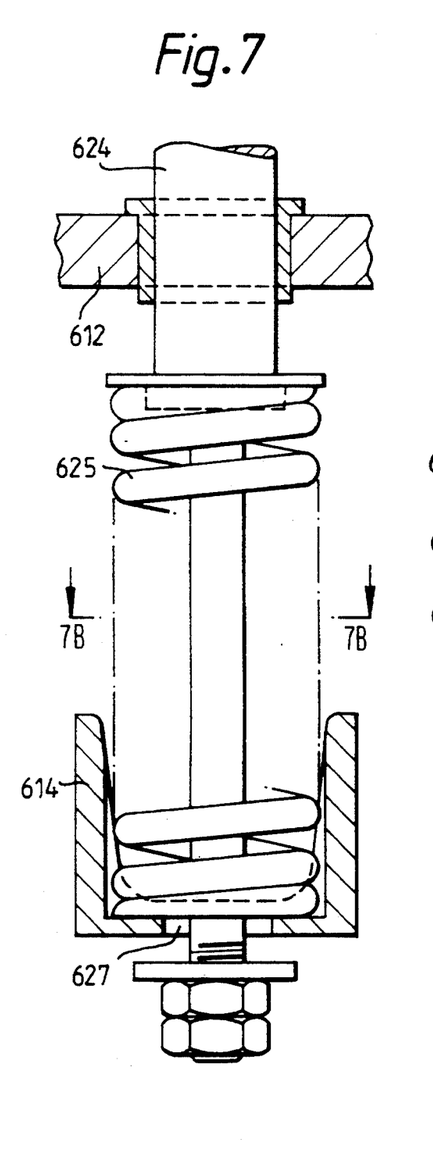
FIG. 7 is a cross-sectional view of a detail of the breaker of FIG. 6.

A detail of the drive mechanism shown in FIG. 6 will now be described in more detail with reference to FIG. 7.

It is a requirement that each interrupter moving contact is driven concentric with its body envelope. To achieve this bearings are required at each end of the insulator drive rod. A simple method of achieving low friction, jam free operation—without the need for a high precision mechanism is achieved as follows. The closing spring 625 is in a machined U-shape pocket on the beam 614 and the drive shaft 624 passes through a large clearance hole 627 in the beam. Thus the drive rod is maintained concentric by the spring and its collar. There is no contact between the drive shaft and the beam which may jam or cause friction.

Figure 7A:
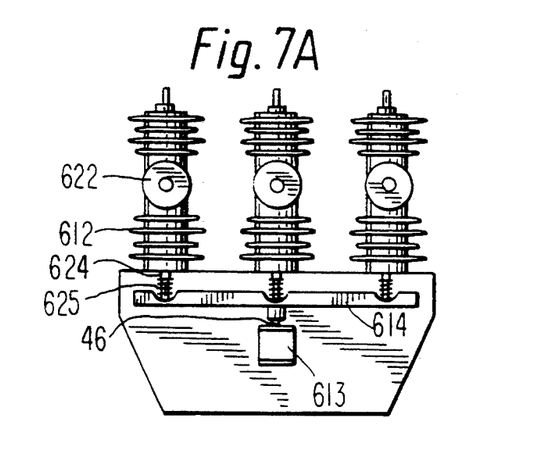
FIG. 7A is a view of a modified drive mechanism.
Figure 7B:
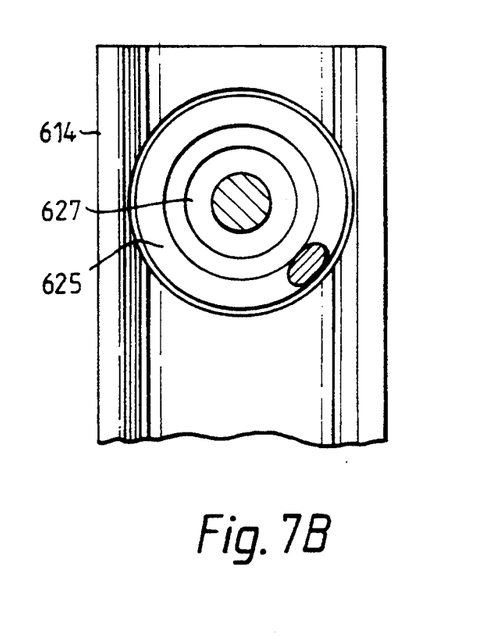
FIG. 7B is a sectional view taken on line 7B—7B of FIG. 7.

FIG. 7A shows the three drive rods 624, one for each interrupter, arranged to be driven together directly by the reciprocable armature 46 of the magnetic actuator 613. The three drive rods 624 are shown linked to the actuator 613 by the single cross-beam 614, each rod 624 being maintained in line by a spring 625 as described in the previous paragraph.

The exemplary drive mechanism helps to achieve a low static loading on the actuator of about 60 kg due to each interrupter, so that with safety margins the maximum total loading on the actuator is in the range 300 kg to 350 kg which can be accommodated by the 96 V lithium sulphur dioxide battery as described above.

We claim:

1. An auto-recloser circuit-breaker for use with a three phase high voltage electrical power distribution line, said auto-recloser circuit-breaker comprising: (a)

three vacuum interrupters for connection one in each phase of the power line; (b) current transformer means for sensing current on the power line; (c) an electronic protection relay having inputs connected to said current transformer means and outputs for providing auto-reclose control pulses; (d) a first, comparatively low voltage, power supply connected for operating the protection relay; (e) operating means for opening and closing the interrupters responsive to the control pulses from the relay, said operating means including a single bistable magnetic actuator and a drive mechanism connected between the three interrupters and the magnetic actuator, said magnetic actuator having a reciprocable armature, two electro-magnetic coils each by their respective energization alone for moving the armature to one of two positions, and a permanent magnet for alone holding the armature in either position after movement thereto by energization of a respective one of said coils; and (f) a second, comparatively high voltage, power supply for energizing the magnetic actuator, said second power supply being connected to each magnetic actuator coil via a respective electronic switch responsive to the auto-reclose control pulses from the relay; said first and second power supplies being provided by lithium sulphur dioxide battery means, said auto-recloser circuit-breaker being powered solely by said battery means and not by the high voltage power line.

2. An auto-recloser circuit-breaker as claimed in claim 1, in which the first and second power supplies are provided each from a separate lithium sulphur dioxide battery.

3. An auto-recloser circuit-breaker as claimed in claim 1, in which the drive mechanism includes three drive rods, one said rod for operating each interrupter, and in which the three drive rods are arranged to be driven together directly by said reciprocable armature of said magnetic actuator in line with the movement of said armature.

4. An auto-recloser circuit-breaker as claimed in claim 3, in which the drive rods are linked to the actuator by a single cross-beam, each rod being maintained in line by a spring in a pocket in the beam without contact between the rod and the beam.

5. An auto-recloser circuit-breaker as claimed in claim 1, in which a magnetic circuit in the actuator due to the permanent magnet provides a static force, to hold the armature in a stable position corresponding to the interrupters being closed, greater than the static force to hold the armature in a stable position corresponding to the interrupters being open.

6. An auto-recloser circuit-breaker as claimed in claim 1, in which at least one of the armature and a pole piece in the actuator is shaped to modify the flux in an air gap between the armature and a said pole piece so that, in response to a control pulse to operate the actuator to an open position of the interrupters, the armature is preferentially biased by the permanent magnet towards said open position.

7. An auto-recloser circuit-breaker as claimed in claim 1, in which a parallel path circuit is provided for each actuator coil to circulate current due to electromotive forces generated in the coils resulting from actuation, and in which impedance is provided in each said parallel path circuit to reduce opposition to movement of the armature due to said current.

8. An auto-recloser circuit-breaker as claimed in claim 1, in which the protection relay includes wake-up and power-down circuit means to reduce consumption of battery energy.

9. An auto-recloser circuit-breaker as claimed in claim 8, in which the wake-up circuit means includes a comparator and a latch constituted by CMOS circuits to minimize the battery energy which is continuously consumed by the wake-up circuit means.

* * * * *